Figure 2:
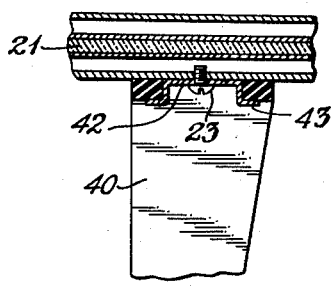

June 23, 1953  M. MAYER  2,643,042

ARTICLE RETAINING MEANS FOR VEHICLE INSTRUMENT PANELS

Filed June 23, 1950

INVENTOR.
MICHAEL MAYER
BY Hudson, Boughton,
Williams, David & Hoffmann
ATTORNEYS Patented June 23, 1953

2,643,042

UNITED STATES PATENT OFFICE 2,643,042

ARTICLE RETAINING MEANS FOR VEHICLE INSTRUMENT PANELS

Michael Mayer, Cleveland, Ohio

Application June 23, 1950, Serial No. 169,873

4 Claims. (Cl. 224—42.42)

This invention relates to article retaining means and, more particularly, to tray-like devices especially adapted for use on the instrument panels of motor vehicles.

Many motor vehicle drivers frequently desire a convenient surface on which small articles may be placed for ready availability and without distracting the attention of the driver from the road. While the instrument panels or dashboards of motor cars frequently have an upper surface of suitable size for such articles, these panels are frequently so shaped that articles will not stay thereon especially when the vehicle is in motion. To overcome this difficulty it has heretofore been proposed to employ article retaining means provided with suction cups or shelves which could be held in place by clips engaging in the defroster openings. Neither of these proposals, nor others of similar nature, have proved entirely successful. Thus, suction cups rapidly deteriorate and loosen, while the space between the defroster openings on most vehicles is so large that a tray or shelf of undesirable size is needed if it is to be secured in this manner. Furthermore, instrument panels are of many and different sizes and shapes in the various makes of motor vehicles so that shelves or trays relying upon the defroster openings as the securing means must be made in a wide variety of sizes and shapes thereby greatly increasing the cost.

An object of this invention is to provide an improved article retaining means which, while not limited thereto, is especially suited for use on the instrument panel of a motor vehicle to prevent displacement therefrom of relatively small articles placed thereon.

Another object of the invention is the provision of an article retaining means for use on the instrument panel of a motor vehicle, which means may be easily and inexpensively manufactured and may be installed with equal ease in all makes of vehicles for cooperation with the instrument panel thereof regardless of the shape of the latter.

A further object of the invention is the provision of an article retaining means for use on the instrument panel of a motor vehicle, the said means being adapted to be secured in place by the headed fasteners utilized to hold the windshield interior molding strip in place, whereby the retaining means is firmly secured and one size of such means may be employed in vehicles of many different makes.

Figure 1:
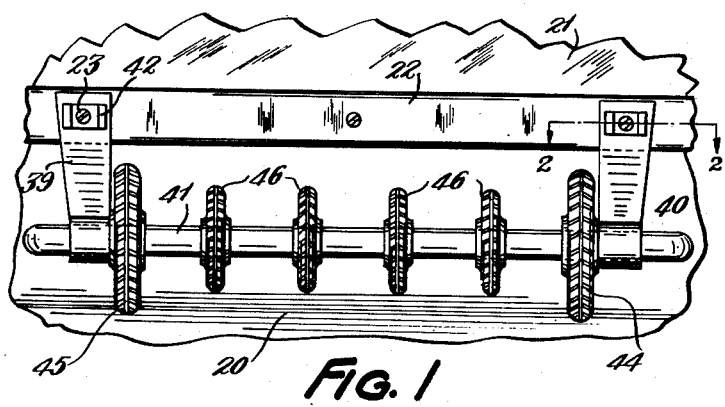

The invention further resides in certain novel features of construction and combination and arrangements of parts, and further objects and advantages thereof will be apparent to those skilled in the art to which the invention pertains from the following description of the presently preferred embodiment thereof illustrated in the accompanying drawing in which:

Fig. 1 is a fragmentary, somewhat diagrammatic, elevational view of a portion of the windshield, instrument panel, and the windshield molding strip of a motor vehicle with the preferred embodiment of the invention associated therewith; and Fig. 2 is an enlarged sectional view taken substantially on the line 2—2 of Fig. 1.

Fig. 1 of the drawings illustrates, somewhat diagrammatically, a portion of the instrument panel or dashboard 20, windshield 21, and the interior molding strip 22 for the windshield of a motor vehicle. As is customary, the windshield molding strip 22 is held in place by headed fasteners 23 such as screws or the like. In accordance with this invention the fasteners 23, in addition to securing the molding strip in place, are utilized to secure the novel article retaining means in place for cooperation with the upper portion of the instrument panel 20, thereby providing a tray-like receptacle or area for the convenient disposition of relatively small articles, such as pipes, matches, compacts, and the like.

In the illustrated embodiment, the article retaining means comprises a pair of flexible side members 39 and 40 the forward ends of which are looped or otherwise provided with openings for receiving a rod 41 which may be formed of metal, glass, plastic, or the like. The other ends of the side members 39 and 40 are apertured to receive mounting clips such as 42 which are secured in place by the screws or fasteners 23, the details of this mounting being shown in Fig. 2.

In view of the fact that the molding strip fasteners or screws 23 are relatively short in length, the clips 42 are preferably made of light sheet metal and are substantially U-shaped with the bight and the legs of the U fitting within the apertures of the side members 39 and 40 respectively, the outer ends of the legs of the U-shaped clip members 42 being provided with outwardly extending flanges 43 which overlie a portion of the side members such as 39, 40 adjacent the openings in which the clips 42 are placed. The central portion of the bight of each clip member 42 has an opening therethrough for the screw or fastener 23. Consequently, by removing the windshield molding strip fasteners 23 and then passing the latter through the clip members 42 before reinserting the fastening means 23 in their windshield molding strip openings, the side members 39 and 40 for the article retaining means are readily secured in place.

As mentioned heretofore, the article retaining means shown includes a rod 41 adjacent the forward edge thereof and this rod is provided with disk-like members such as 44, 45 which are preferably formed of rubber, plastic, or the like and simulate small rubber tires on disk wheels frictionally fitted on the rod 41. The disk-like members 44, 45 may be placed either between the side members 39, 40, as shown, or exteriorly thereof, if desired, and since they are frictionally engaged on the rod 41 the distance between the disks 44, 45 may be readily adjusted to compensate for different distances between fastening means 23 on different makes of vehicles. Intermediate the disk-like members 44, 45 the rod 41 is preferably provided with a plurality of disk-like members such as 46 which are identical in construction with the disk-like members 44, 45 but are preferably of smaller diameter.

By the construction just described, it will be apparent that the disk-like members 44, 45 rest upon the upper surface of the instrument panel 20, the distance of the rod 41 above the surface of the panel 20 being determined by the diameter of the disk members 44, 45. The flexibility of the side members 39, 40 and the fact that the disk members 44, 45 may be adjusted along the rod 41 provides for ready compensation for different curvatures of the instrument panel 20. The disk-like members 46 are not intended normally to touch the top surface of the instrument panel 20 but are provided to prevent articles placed within the area defined by the rod 41, the windshield 21, and side members 39, 40 from being displaced therefrom. Consequently, the disk members 46 may be of any desired number and may be adjusted to be closer or further from each other as may be necessary dependent upon the size of the article or articles to be retained.

It will now be evident that by this invention, a novel article retaining means has been provided for use on the instrument panel or dashboard of motor vehicles and which may be readily adapted to motor vehicles of various makes and having different configurations of their instrument panels. Moreover, the article retaining means is firmly and securely held in place without the need of marring the finish of the instrument panel or providing special brackets or the like, the securing being effected by utilizing the windshield molding strip fasteners as the securing means. Moreover, the retaining means may be simply and easily constructed in a very inexpensive manner.

While a preferred embodiment of the invention has been herein illustrated and described in considerable detail, it will be appreciated that modifications may be effected by those skilled in the art within the scope of the invention. Consequently, the specific illustrations and description are intended only as illustrative and not as limitations, except as expressly required by the spirit and scope of the appended claims.

Having thus described the invention, I claim:

1. A device for preventing displacement of articles resting on the upper surface of the instrument panel of a motor vehicle having a windshield provided with an interior molding strip secured in place by headed fasteners, the said device comprising a pair of substantially parallel flexible members each apertured adjacent one end, an apertured flanged member for each of said flexible members with the apertured portion of each flanged member disposed in the aperture of one of said flexible members respectively and receiving one of said molding strip fasteners therethrough, a rigid rod connected with the other end of each of said flexible members, and a plurality of disk-like members frictionally engaged on said rod whereby articles placed on said instrument panel within the area thereof enclosed by said flexible members and said rod are retained from displacement.

2. A device of the character described comprising a pair of spaced elongated flexible members, means securing each of said members to a rigid support adjacent one end only of the said members, a rigid rod connected with the said flexible members adjacent the other ends thereof and extending transversely thereof, and a plurality of spaced disk-like members removably secured to said rod and adapted to engage a portion of said rigid support at spaced points thereon, whereby the said flexible members and rod define an article retaining region on the surface of said rigid support.

3. A device as defined in claim 2 and wherein certain of the said disk-like members are of larger diameter than others of said members thereby accommodating the said device to a non-planar surface of the rigid support on which it is mounted.

4. A device for preventing displacement of articles resting on the upper surface of the instrument panel of a motor vehicle having a windshield provided with an interior molding strip secured in place by headed fasteners, the said device comprising substantially parallel flexible portions extending in spaced relationship interiorly of the vehicle over the upper surface of said instrument panel from a point adjacent said windshield molding strip thereby providing the side supports for said device, a rigid rod adjustably connected to the forward ends of said flexible portions and extending transversely thereof to define the forward portion of said device, a plurality of spaced disk-like members removably secured to said rod and adapted to be supported upon the upper surface of said instrument panel, and means receivable under the heads of said molding strip fasteners and cooperating with said flexible portions for securing said device from displacement relative to said instrument panel.

MICHAEL MAYER.

References Cited in the file of this patent

UNITED STATES PATENTS

| Number | Name | Date |
|---|---|---|
| 2,022,769 | Jarecki et al. | Dec. 3, 1935 |
| 2,100,261 | Montgomery | Nov. 23, 1937 |
| 2,184,047 | King | Dec. 19, 1939 |
| 2,459,459 | Seaman | Jan. 18, 1949 |
| 2,487,301 | Borah | Nov. 8, 1949 |
| 2,494,980 | Zuckerman | Jan. 17, 1950 |
| 2,517,337 | Nodle | Aug. 1, 1950 |
| 2,536,084 | Peters et al. | Jan. 2, 1951 |
| 2,540,023 | Ackerman | Jan. 30, 1951 |
| 2,547,883 | Olsen | Apr. 3, 1951 |